United States Patent
Seeley et al.

(10) Patent No.: US 10,808,788 B2
(45) Date of Patent: Oct. 20, 2020

(54) DAMPER FOR A FUEL DELIVERY SYSTEM

(71) Applicant: General Electric Company, Schenectady, NY (US)

(72) Inventors: Charles Erklin Seeley, Niskayuna, NY (US); Walter John Smith, Ballston Spa, NY (US); Suryarghya Chakrabarti, Niskayuna, NY (US); Andrew Joseph Wickersham, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 460 days.

(21) Appl. No.: 15/481,507

(22) Filed: Apr. 7, 2017

(65) Prior Publication Data

US 2018/0291976 A1   Oct. 11, 2018

(51) Int. Cl.
| | |
|---|---|
| *F16F 1/12* | (2006.01) |
| *F16F 7/02* | (2006.01) |
| *F16F 7/04* | (2006.01) |
| *F16F 7/06* | (2006.01) |
| *F16F 13/00* | (2006.01) |
| *F23R 3/28* | (2006.01) |
| *F16F 7/09* | (2006.01) |
| *E05F 5/02* | (2006.01) |

(52) U.S. Cl.
CPC ............... *F16F 7/02* (2013.01); *F16F 7/04* (2013.01); *F16F 7/06* (2013.01); *F16F 7/09* (2013.01); *F16F 13/005* (2013.01); *F23R 3/28* (2013.01); *F23R 3/283* (2013.01); *F16F 2222/04* (2013.01); *F16F 2224/0208* (2013.01); *F23K 2300/20* (2020.05); *F23K 2400/20* (2020.05); *F23R 2900/00005* (2013.01)

(58) Field of Classification Search
CPC .......... F16D 25/088; F16D 25/14; B60T 8/00; B60T 8/368; F16F 1/12; F16F 1/128; E05F 5/02
USPC ......... 192/30 V, 109 F; 303/87, 39; 188/381; 267/196, 201, 205, 207
See application file for complete search history.

(56) References Cited

U.S. PATENT DOCUMENTS

| | | |
|---|---|---|
| 3,793,838 A | 2/1974 | Nash |
| 5,044,338 A | 9/1991 | Shelton |

(Continued)

FOREIGN PATENT DOCUMENTS

DE     4406984 A1     9/1995

OTHER PUBLICATIONS

Bellucci et al., "Thermoacoustic Modeling of a Gas Turbine Combustor Equipped With Acoustic Dampers", ASME Turbo Expo 2004: Power for Land, Sea, and Air, vol. 1, pp. 635-644, 2004, Vienna, Austria, Jun. 14-17.

*Primary Examiner* — Christopher P Schwartz
(74) *Attorney, Agent, or Firm* — Dority & Manning, P.A.

(57) ABSTRACT

Dampers and a fuel delivery systems including such dampers are disclosed. The damper includes a first component and a dampening component. The first component is coupled to a first tubular element and includes a first extended hollow section. The dampening component is coupled to a second tubular element. The dampening component includes a first end portion including a plurality of slits. The first end portion is disposed within the first extended hollow section to frictionally couple the first end portion to the first extended hollow section.

20 Claims, 6 Drawing Sheets

(56) References Cited

U.S. PATENT DOCUMENTS

| | | | | |
|---|---|---|---|---|
| 5,320,203 | A * | 6/1994 | Wilber | F16D 25/088 |
| | | | | 192/109 F |
| 5,369,952 | A | 12/1994 | Walters | |
| 5,664,848 | A * | 9/1997 | Muraski | B60T 8/00 |
| | | | | 138/31 |
| 6,101,811 | A * | 8/2000 | Nix | F16L 55/041 |
| | | | | 60/469 |
| 6,203,117 | B1 * | 3/2001 | Starr | B60T 8/368 |
| | | | | 138/31 |
| 6,405,845 | B1 * | 6/2002 | Muller | F16D 25/14 |
| | | | | 188/380 |
| 7,870,871 | B1 * | 1/2011 | Hanjagi | F02M 37/0041 |
| | | | | 138/26 |
| 8,727,299 | B2 | 5/2014 | Tatry | |
| 9,115,840 | B2 * | 8/2015 | Sinadinos | F16L 55/033 |
| 9,140,213 | B2 | 9/2015 | Sadil et al. | |
| 9,447,975 | B2 | 9/2016 | McConnaughhay et al. | |
| 10,415,480 | B2 * | 9/2019 | Han | F02C 7/222 |
| 10,451,131 | B2 * | 10/2019 | Nakasone | F16F 1/12 |
| 10,477,830 | B2 * | 11/2019 | Earls | F16B 7/0493 |
| 2006/0101615 | A1 * | 5/2006 | Pinzl | E05F 5/022 |
| | | | | 16/82 |
| 2016/0177836 | A1 | 6/2016 | Wickström et al. | |

\* cited by examiner

DAMPER FOR A FUEL DELIVERY SYSTEM

BACKGROUND

Embodiments of the present disclosure relate to a fuel delivery system, and more specifically, to a damper configured to frictionally resist relative motion between at least two tubular elements of the fuel delivery system.

Vibration of one or more components of a turbomachine (e.g., a jet engine) may lead to fatigue failure of the respective component(s). For example, vibration generated from engine operation, fluid flow, acoustic interactions, and other sources within a turbomachine may excite one or more components of the turbomachine such as a fuel delivery system. Generally, manifold conduits and pigtail conduits of the fuel delivery system are configured to supply fuel and/or compressed fluid to one or more fuel nozzles of the fuel delivery system. These components may also be susceptible to vibration and/or thermal expansion, since the manifold conduits and/or the pigtail conduits may be flexible and often have complex structures with low mechanical impedance.

Vibration on the manifold conduits and pigtail conduits may be regulated by applying coatings of viscoelastic materials on these components. However, such viscoelastic materials may not be effective on conduits disposed near combustors of the turbomachine, because such conduits operate at very high temperatures, for example, in a range from about 900 degrees Fahrenheit to about 1200 degrees Fahrenheit. Vibration isolators, for example, vibration mounts may be used as an alternative to coating for dampening vibration of components of the fuel delivery system. However, coupling the manifold and/or pigtail conduits to some components of the turbomachine through the vibration mounts may not be feasible, since such coupling are generally rigid in nature, and may result in generating a very high static stress on the components. Accordingly, there is a need for an enhanced damper to regulate vibration of a fuel delivery system and allow static movements generated due to thermal expansion of the fuel delivery system.

BRIEF DESCRIPTION

In accordance with one example embodiment, a damper is disclosed. The damper includes a first component and a dampening component. The first component is coupled to a first tubular element and includes a first extended hollow section. The dampening component is coupled to a second tubular element and includes a first end portion including a plurality of slits. The first end portion is disposed within the first extended hollow section to frictionally couple the first end portion to the first extended hollow section.

In accordance with another example embodiment, a damper is disclosed. The damper includes a first component and a dampening component. The first component is coupled to the first tubular element and includes a first extended hollow section. The dampening component is coupled to a second tubular element and includes a first end portion including a plurality of slits. A portion of the dampening component is disposed within the first extended hollow section to frictionally couple the first end portion to the first extended hollow section. The damper is configured to frictionally resist a relative motion between the first and second tubular elements by performing one or more of: a) frictionally slide the dampening component within the first extended hollow section along an axial direction of the dampening component, b) frictionally rotate the dampening component within the first extended hollow section along a circumferential direction of the dampening component, and frictionally tilt the dampening component within the first extended hollow section, relative to the axial direction.

In accordance with yet another example embodiment, a fuel delivery system is disclosed. The fuel delivery system includes a conduit assembly and a damper. The conduit assembly includes a plurality of tubular elements, each of the plurality of tubular elements includes a first tubular element and a second tubular element. The second tubular element is fluidly coupled to the first tubular element and a fuel injector. The damper includes a first component and a dampening component. The first component is coupled to the first tubular element and includes a first extended hollow section. The dampening component is coupled to the second tubular element and includes a first end portion including a plurality of slits. A portion of the dampening component is disposed within the first extended hollow section to frictionally couple the first end portion to the first extended hollow section.

DRAWINGS

These and other features and aspects of embodiments of the present disclosure will become better understood when the following detailed description is read with reference to the accompanying drawings in which like characters represent like parts throughout the drawings, wherein.

DETAILED DESCRIPTION

Figure 1:
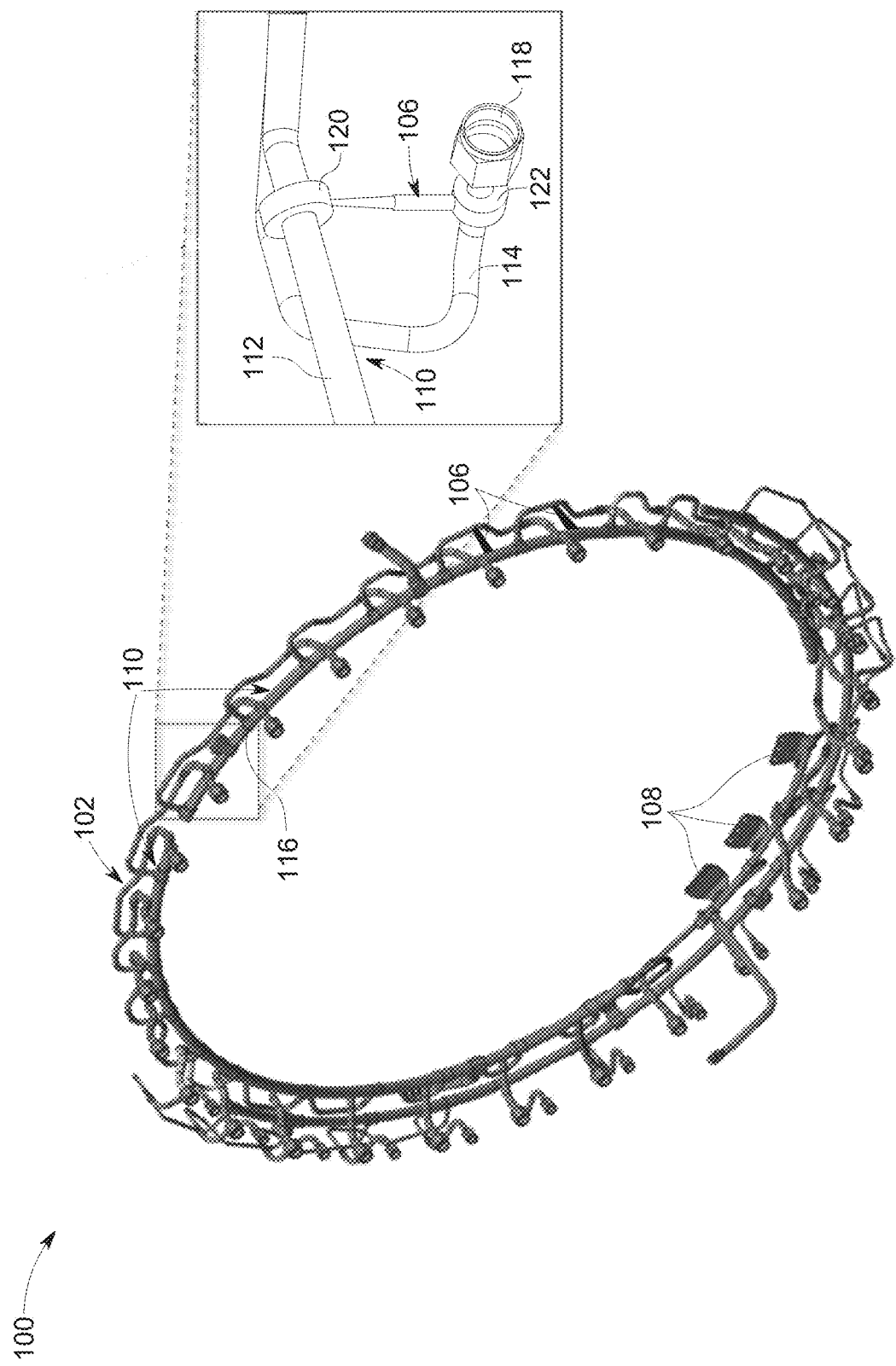
FIG. 1 is a perspective view of a fuel delivery system in accordance with one example embodiment of the present disclosure.

To more clearly and concisely describe and point out the subject matter, the following definitions are provided for specific terms, which are used throughout the following description and the appended claims, unless specifically denoted otherwise with respect to particular embodiment. The terms "frictionally coupled" or "frictionally couple" as used in the context refers to movably connecting at least two components such that the at least two components frictionally resist a relative motion between them. For example, movably connecting a dampening component to a first component and/or the dampening component to a second component such that interacting surfaces of the first component or the second component frictionally resist the relative motion between them. The term "operatively coupled" as used in the context refers to connecting at least two components to each other such that they function together in a mutually compatible manner to perform an intended operation. For example, the dampening component is connected to the second tubular element via the second component such that the dampening component and the second component assembly function together in a mutually compatible manner for coupling the assembly to the second tubular component. The term "a portion of the dampening component" as used in the context refers to the portion having the first end portion of the dampening component. Similarly, the term "another portion of the dampening component" as used in the context refers to the portion having the second end portion of the dampening component. The term "fluidly coupled" as used in the context refers to a connection between two or more components such that they are in fluid communication with each other. For example, the first and second tubular elements are connected to one another such that the first and second tubular elements are in a fluid communication with each other. It should be noted herein that the term "interacting surfaces" refers to surfaces of the at least two components, which are frictionally coupled to each other. For example, interacting surfaces refers to an outer surface of the first end portion and an inner surface of the first extended hollow section or to an outer surface of the second end portion and an inner surface of the second extended hollow section.

Embodiments of the present disclosure discussed herein relate to a damper configured to frictionally resist the relative motion between a first and a second tubular elements of a fuel delivery system. In certain embodiments, the damper includes a first component coupled to a first tubular element and a dampening component coupled to a second tubular element. The first component includes a first extended hollow section. The dampening component includes a first end portion including a plurality of slits. In such embodiments, the first end portion is disposed within the first extended hollow section of the first component to frictionally couple the first end portion to the first extended hollow section.

In one embodiment, the first component is coupled to the first tubular element via a first retention element. In such embodiments, the first component is coupled to the first retention element, which includes a first through-hole for receiving and holding the first tubular element. The dampening component is coupled to the second tubular element via a second retention element. In such embodiments, the dampening component is coupled to the second retention element, which includes a second through-hole for receiving and holding the second tubular element.

In some other embodiments, the damper may further include a second component, and the dampening component may be operatively coupled to the second tubular element via the second component. Further, the second component may be coupled to the second tubular element via the second retention element. In such embodiments, the second component includes a second extended hollow section. The dampening component includes a second end portion opposite to the first end portion and including a plurality of slits. The second end portion is disposed within a second extended hollow section to frictionally couple the second end portion to the second extended hollow section.

In one embodiment, the fuel delivery system includes a conduit assembly and the damper. The conduit assembly includes a plurality of tubular elements, and each of the plurality of tubular elements includes a first tubular element and a second tubular element. The first tubular element and the second tubular element is fluidly coupled to the first tubular element and a fuel injector. In such embodiments, the first tubular element may be a manifold conduit and the second tubular element may be a pigtail conduit.

In one or more embodiments, the damper is configured to frictionally resist the relative motion between the first and second tubular elements by performing one or more of i) frictionally slide the dampening component within the first extended hollow section along an axial direction of the dampening component, ii) frictionally rotate the dampening component within the first extended hollow section along a circumferential direction of the dampening component, and iii) frictionally tilt the dampening component within the first extended hollow section, relative to the axial direction. In one embodiment, the relative motion is generated because of vibration from one or both of the combustor and a dome of a turbomachine. In some embodiments, the relative motion may be generated because of static movements produced by thermal expansion of first and second tubular elements disposed around the combustor. In such embodiments, the damper may also allow the relative motion between the first and second tubular elements, and thereby prevent static stress on the first and second tubular elements. In some other embodiments, static movements may be produced due to the thermal expansion of either of the first tubular element and the second tubular element. In such embodiments, the damper may allow the static movements of the first tubular element or the second tubular element, thereby preventing static stress on the first tubular element or the second tubular element.

The plurality of slits in one or both of the first end portion and the second end portion may be configured to regulate i) stiffness of the first and second end portions, ii) an amount of interacting surface of the first end portion and the first extended hollow section to frictionally resist the relative motion between the dampening component and the first component, and/or iii) an amount of interacting surface of the second end portion and the second extended hollow section to frictionally resist the relative motion between the dampening component and the second component. In one or more embodiments, the first component and the dampening component may be configured to frictionally couple at least two tubular elements that are not positioned parallel to one another and are disposed in different planes. Since, the damper is indirectly coupled to the first and second tubular elements via the first and second retention elements, the damper may frictionally resist the relative motion between the first and second tubular elements having different dimensions. For example, the first tubular element may have a first diameter and the second tubular element may have a second diameter different from the first diameter. Further, the damper is made of high temperature alloy material, thereby allowing the damper to be deployed in a high temperature application area, which operates in a temperature range from about 900 degrees Fahrenheit to about 1200 degrees Fahrenheit.

Figure 2:
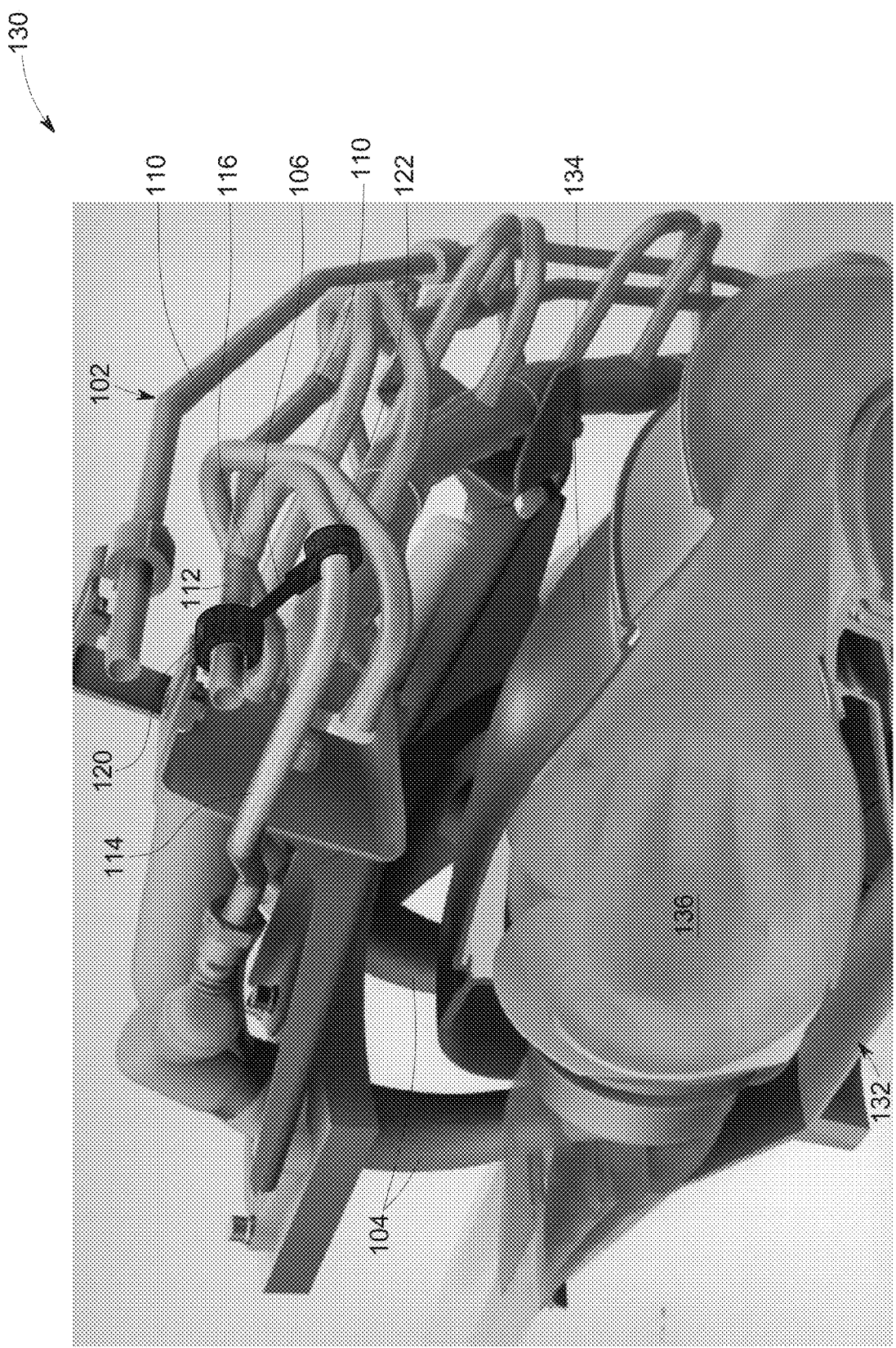
FIG. 2 is a perspective view of a portion of a turbomachine including the fuel delivery system of FIG. 1 in accordance with one example embodiment of the present disclosure.

FIG. 1 illustrates a perspective view of a fuel delivery system 100 in accordance with one example embodiment of the present disclosure. The fuel delivery system 100 includes a conduit assembly 102, a plurality of fuel nozzles 104 (as shown in FIG. 2), and a plurality of dampers 106. The fuel delivery system 100 may be disposed around a combustor of a turbomachine (not shown in FIG. 1) and clamped to the combustor and/or a dome of the turbomachine, for example, by using a plurality of clamping elements 108. In certain other embodiments, the fuel delivery system 100 may be disposed proximate to the combustor and clamped to some other components of the turbomachines such as a discharge casing of a compressor. In certain embodiments, the fuel delivery system 100 may be configured to supply fuel and/or a compressed fluid to the combustor.

The conduit assembly 102 includes a plurality of tubular elements 110. In the illustrated embodiment, the plurality of tubular elements 110 are connected to each other to define a circular shaped profile for the fuel delivery system 100. In some other embodiments, the plurality of tubular elements 110 when connected to each other may define some other shapes such as oval or ellipse, which may match peripheral surface of the combustor. The shape defined by the interconnected tubular elements 110 should not be construed as a limitation of the present disclosure. Each of the plurality of tubular elements 110 includes a first tubular element 112 and a second tubular element 114. In certain embodiments, the plurality of tubular elements 110 may further include a third tubular elements, a fourth tubular elements, so on and so forth, without deviating from the scope of the present disclosure. In one embodiment, the first tubular element 112 is a manifold conduit and the second tubular element 114 is a pigtail conduit. In some embodiments, the first tubular element 112 and the second tubular element 114 are flexible conduits. In some other embodiments, the first tubular element 112 and the second tubular element 114 may be rigid conduits. In the illustrated embodiment, the first tubular element 112 and the second tubular element 114 are disposed along a same plane and are parallel to one another. In some other embodiments, the first tubular element 112 and the second tubular element 114 may be disposed in different planes and may or may not be parallel to one another. The first tubular element 112 is configured to receive the fuel from a fuel source (not shown in FIG. 1) and distribute the fuel to the plurality of fuel nozzles 104. In the illustrated embodiment, the second tubular element 114 is coupled to the first tubular element 112 via a connector such as a three-way connector 116 and to a corresponding fuel nozzle 104 via a fastening mechanism such as a B-nut 118. The second tubular element 114 is fluidly connected to allow a flow of a portion of the fuel from the first tubular element 112 to the corresponding fuel nozzle 104. In certain embodiments, the fuel may include fluid stream including a fluid mixture derived as a result of the processing of fuels such as natural gas, biomass, gasoline, diesel fuel, oil shale, fuel oil, or combinations thereof. The term "fluid stream" as used herein refers one or both of gas and liquid components. In some embodiments, the fluid stream includes syngas generated by gasification or a reforming plant. The plurality of fuel nozzles 104 is configured to inject atomized fuel into a corresponding combustion zone of the combustor. In some embodiments, each of the plurality of fuel nozzles 104 may be configured to inject mixture of the fuel and the compressed fluid to the corresponding combustion zone. In certain embodiments, the compressed fluid may be air or enriched oxygen. The combustor is configured to ignite the mixture of the fuel and the compressed fluid to generate combustion fluid that are channeled to a turbine (not shown in FIG. 1) and then discharged from turbine after the work, as exhaust fluid.

In the illustrated embodiment, the damper 106 is coupled to the first tubular element 112 and the second tubular element 114. Specifically, the damper 106 is coupled to the first tubular element 112 via a first retention element 120 and to the second tubular element 114 via a second retention element 122. In the illustrated embodiment, the first retention element 120 and the second retention element 122 are clamps. The first retention element 120 includes a first through hole to receive and hold the first tubular element 112. Similarly, the second tubular element 114 includes a second through-hole to receive and hold the second tubular element 114. The damper 106 is clamped to the first and second retention elements 120, 122. During operation of the turbomachine, some components of the turbomachine disposed near the combustor may experience static movements, for example, due to thermal expansion. For example, the first and second tubular elements 112, 114 may experience the static movements relative to one another. In such embodiments, the damper 106 may allow the static movements of the first and second tubular elements 112, 114, and thereby prevent static stress on the first and/or second tubular elements 112, 114. Similarly, vibration that is generated from the turbomachines, e.g., from the combustor and/or dome may get transferred to the first and second tubular elements 112, 114, thereby causing relative motion between them. In certain embodiments, relative motion between the first and second tubular elements 112, 114 may occur along an axial direction of the damper 106, a circumferential direction of the damper 106, and a tilting motion relative to the axial direction. In such embodiments, the damper 106 may be configured to regulate the vibration by frictionally resisting the relative motion between the first and second tubular elements 112, 114. Various example embodiments of damper 106 of the present disclosure is discussed in greater detail below.

FIG. 2 illustrates a perspective view of a portion of the turbomachine 130 in accordance with the example embodiment of FIG. 1. In one embodiment, the turbomachine 130 includes a combustor 132 and a fuel delivery system 100. In one embodiment, the fuel delivery system 100 includes a conduit assembly 102, a plurality of fuel nozzles 104, and a plurality of dampers 106. It should be noted herein that the turbomachine 130 shown in FIG. 2 illustrates only one damper 106 for ease of illustration and such an illustration should not be construed as a limitation of the example embodiment. The fuel delivery system 100 may be disposed proximate to an upstream end of the combustor 132, around the combustor 132, or coupled to a liner 134 of the combustor 132 via one or more clamping elements 108 (as shown in FIG. 1). The conduit assembly 102 includes a plurality of tubular elements 110 and each of the plurality of tubular elements 110 includes a first tubular element 112 and a second tubular element 114. In certain embodiments, the first and second tubular elements 112, 114 are fluidly coupled to one another a connector such as a three-way connector 116. Further, the second tubular element 114 is fluidly coupled to a corresponding fuel nozzle of the plurality of fuel nozzles 104. The damper 106 is coupled to the first tubular element 112 via a first retention element 120. The damper 106 is further coupled to the second tubular element 112 via a second retention element 122. In some embodiments, the damper 106 may be welded to the first and second retention elements 120, 122.

During operation, each of the plurality of fuel nozzles 104 is configured to receive the compressed fluid such as compressed air and the fuel from the second tubular element 114. Further, the corresponding fuel nozzle 104 is configured to inject a mixture of the fuel and the compressed fluid to a combustion zone 136 so as to ignite the mixture of the fuel and the compressed fluid to generate combustion fluid. In such embodiments, the combustion fluid is directed into a turbine and then discharged from turbine after the work, as exhaust fluid. In such embodiments, the damper 106 is configured to dampen vibration between the first and second tubular elements 112, 114.

Figure 3:
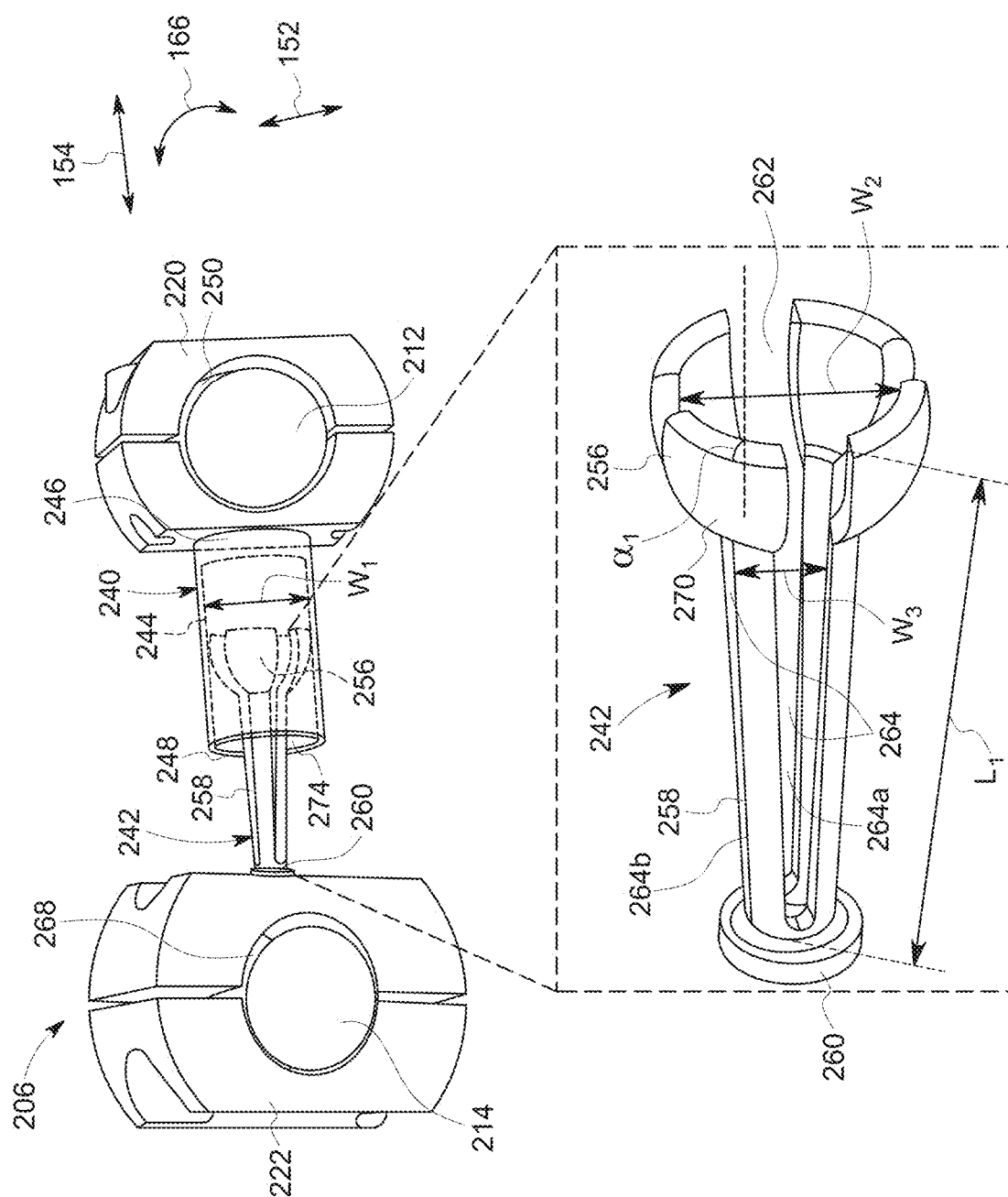
FIG. 3 is a perspective view of a damper in accordance with one embodiment of the present disclosure.

FIG. 3 illustrates a perspective view of a damper 206 in accordance with one embodiment of the present disclosure. In one example embodiment, the damper 206 includes a first component 240 and a dampening component 242. In one embodiment, the damper 206 is configured to frictionally resist a relative motion between a first tubular element 212 and a second tubular element 214 to regulate vibration between the first and second tubular elements 212, 214.

The first component 240 includes a first extended hollow section 244 including a first end 246 and a second end 248. The first end 246 is coupled to the first tubular element 212 via a first retention element 220, thereby closing the first end 246 against the first retention element 220. In one embodiment, the first end 246 is welded to the first retention element 220. In some other embodiments, the first end 246 may be coupled to the first retention element 220 via a plurality of clamps. In the illustrated embodiment, the first retention element 220 has a first through-hole 250 for receiving the first tubular element 212 along a radial direction 152 of the first component 240 and holding the first tubular element 212. The first extended hollow section 244 extends along an axial direction 154 of the first component 240. The first extended hollow section 244 has a first width "$W_1$".

In some embodiment, the dampening component 242 may be a cantilever component having a first end portion 256 and an arm portion 258 disposed adjacent to the first end portion 256 as shown in FIG. 3. In the illustrated embodiment, the first end portion 256 has a spherical structure and the arm portion 258 has a conical structure. The arm portion 258 has a second end portion 260 located opposite to the first end portion 256. Further, the first end portion 256 and the arm portion 258 have a hollow portion 262. The first end portion 256 has a second width "$W_2$" and the arm portion 258 has a third width "$W_3$" different from the second width "$W_2$". In the illustrated embodiment, the third width "$W_3$" is smaller than the second width "$W_2$". Further, the second width "$W_2$" is smaller than the first width "$W_1$". The dampening component 242 includes a plurality of slits 264 extending along the axial direction 154 from the first end portion 256 towards the second end portion 260 up to a length "$L_1$". In some other embodiments, the length "$L_1$" may not extend the entire length of the dampening component 242 till the second end portion 260. The plurality of slits 264 is spaced apart from each other along a circumferential direction 166 of the dampening component 242. For example, the plurality of slits 264 includes a first slit 264a and a second slit 264b that are spaced apart from each other along the circumferential direction 166. The second end portion 260 is coupled to a second retention element 222. In one embodiment, the second end portion 260 is welded to the second retention element 222. In some other embodiments, the second end portion 260 may be coupled to the second retention element 222 via a plurality of clamps. In the illustrated embodiment, the second retention element 222 has a second through-hole 268 for receiving the second tubular element 214 along the radial direction 152 and holding the second tubular element 214. The first end portion 256 has a first curved end surface inclined at a first angle "$\alpha_1$" relative to the axial direction 154 of the dampening component 242. The first component 240 and the dampening component 242 may be made of high temperature alloy material, for example, a cobalt-nickel-chromium-tungsten alloy. In certain embodiments, the dampening component 242 may further include a wear resistant coating, for example, a silicon carbide disposed on an outer surface 270 of the first end portion 256 to prevent wearing of the first end portion 256. The dampening component 242 may be a flexible component configured to bend along the radial direction 152. The first end portion 256 is disposed within the first extended hollow section 244 to frictionally couple the first end portion 256 to the first extended hollow section 244. While installation, the first end portion 256 is squeezed inwardly along the radial direction 152 and disposed within the first extended hollow section 244 through the second end 248 of the first extended hollow section 244 such that the outer surface 270 of the first end portion 256 is frictionally coupled to an inner surface 274 of the first extended hollow section 244. In the illustrated embodiment, the first tubular element 212 and the second tubular element 214 are disposed parallel to each other along a same plane. In such embodiments, the first end portion 256 of the dampening component 242 may be inserted into the first extended hollow section 244 at 0 degree relative to the axial direction 154. In some other embodiments, the first tubular element 112 and the second tubular element 114 may not be disposed along a same plane and may not be parallel to one another. In such embodiments, the damper 206 may be configured to frictionally resist relative motion generated by the first tubular element 112 and the second tubular element 114 disposed along different planes and not parallel to one another.

In certain embodiments, the plurality of slits 264 and the material of the dampening component 242 may define stiffness of the dampening component 242, and thereby static frictional forces generated by the dampening component 242 against the first extended hollow section 244. Further, the plurality of slits 264 may define an amount of interacting surface, for example, the outer surface 270 and the inner surface 274 of the first end portion 256 and the first extended hollow section 244 respectively to frictionally resist the relative motion between the dampening component 242 and the first component 240. It should be noted herein that the interacting surface may refer to an outer surface area of the first end portion 256 and an inner surface area of the first extended hollow section 244.

During operation of the turbomachine, one or more components of the turbomachine, for example, a combustor and a dome may vibrate and/or undergo thermal expansion, thereby affecting the plurality of tubular elements including the first tubular element 212 and the second tubular element 214 to move relative to each other. In such embodiments, the relative motion between the first and second tubular elements 212, 214 may result in producing a frictional force between the dampening component 242 and the first component 240. In one embodiment, the dampening component 242 may be held in a locked position within the first component 240 until sliding forces produced between the dampening component 242 and the first component 240 due to vibration exceed static frictional forces generated between the first end portion 256 of the dampening component 242 and the first extended hollow section 244 of the first component 240. In certain embodiments, the static frictional forces may be generated due to geometrical interferences between the first end portion 256 and the first extended hollow section 244. Once the sliding forces exceeds the static friction forces, the dampening component 242 may slide or rotate within the first extended hollow section 244, and thereby frictionally resist the relative motion between the first and second tubular elements 212, 214 to dampen the vibration. Further, the dampening component 242 may be allowed to slide or rotate within the first component 240, thereby managing static movements generated due to the thermal expansion of the first and/or second tubular elements 212, 214.

Figure 4:
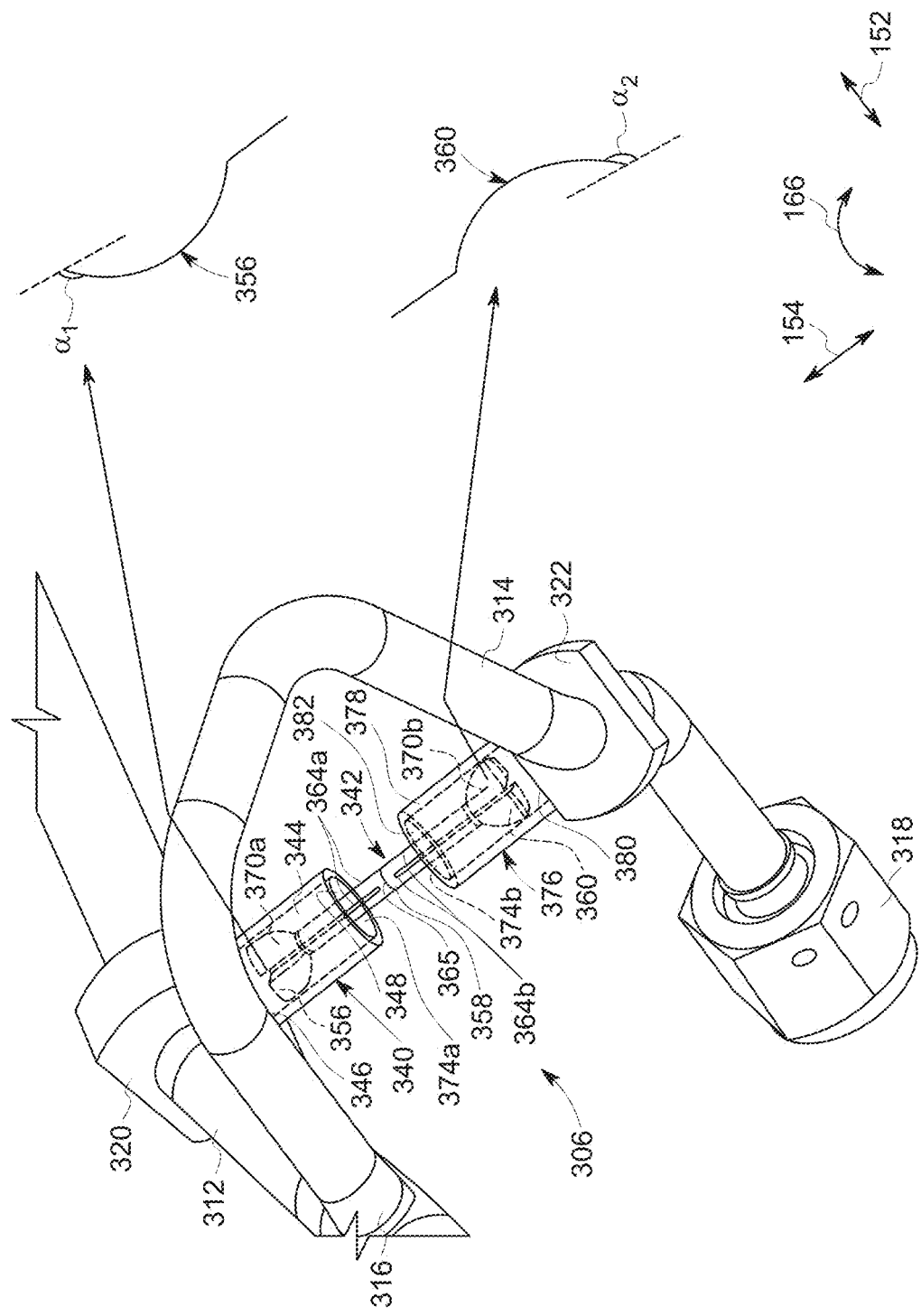
FIG. 4 is a perspective view of a damper in accordance with another embodiment of the present disclosure.

FIG. 4 illustrates a perspective view of a damper 306 in accordance with another embodiment of the present disclosure. In one example embodiment, the damper 306 includes a first component 340, second component 376, and a dampening component 342. In one embodiment, the damper 306 may be configured to frictionally resist a relative motion between a first tubular element 312 and a second tubular element 314 to regulate vibration between the first and second tubular elements 312, 314. In certain embodiments, the dampening component 342 is configured to handle the relative motion between the first tubular element 312 and the second tubular element 314 occurring along multiple directions. In the illustrated embodiment, the first tubular element 312 and the second tubular element 314 are coupled to each other via a connector such as a three-way connector 316. Further, the second tubular element 314 may be coupled to a fuel nozzle via a fastening mechanism such as a B-nut 318.

In the illustrated embodiment, the first component 340 includes a first extended hollow section 344 including a first end 346 and a second end 348. The first end 346 is coupled to the first tubular element 312 via a first retention element 320. The first extended hollow section 344 extends along an axial direction 154 of the first component 340. The second component 376 includes a second extended hollow section 378 including a first end 380 and a second end 382. The first end 380 is coupled to the second tubular element 314 via a second retention element 322. The second extended hollow section 378 extends along the axial direction 154.

The dampening component 342 includes a first end portion 356, a second end portion 360, and an arm portion 358 extending between the first end portion 356 and the second end portion 360. The arm portion 358 extends along the axial direction 154. The first end portion 356 is located opposite to the second end portion 360. In the illustrated embodiment, the first and second end portions 356, 360 have a spherical structure and the arm portion 358 has a conical structure. In some embodiment, the dampening component 342 is a monolithic component. In some other embodiments, the dampening component 342 is discrete component. In some embodiments, the dampening component 342 may be made of at least two dampening components 242 of the embodiment of FIG. 3, with the second end portions 260 of the respective dampening component 242 coupled to one another. The dampening component 342 includes a plurality of slits 364a extending along the axial direction 154 from the first end portion 356 towards a center portion 365 of the dampening component 342. Similarly, the dampening component 342 further includes a plurality of slits 364b extending along the axial direction 154 from the second end portion 360 towards the center portion 365. The plurality of slits 364a, 364b are spaced apart from each other along a circumferential direction 166 of the dampening component 342. The first end portion 356 includes a first curved end surface inclined at a first angle "$\alpha_1$" relative to the axial direction 154 of the dampening component 342. The second end portion 360 includes a second curved end surface inclined at a second angle "$\alpha_2$" relative to the axial direction 154. In one embodiment, the first angle "$\alpha_1$" and the second angle "$\alpha_2$" are same. In some other embodiments, the first angle "$\alpha_1$" and the second angle "$\alpha_2$" are different from one another. The first component 340, the second component 376, and the dampening component 342 may be made of high temperature alloy material, for example, a cobalt-nickel-chromium-tungsten alloy. In certain embodiments, the dampening component 342 may further include a wear resistant coating, for example, silicon carbide disposed on an outer surface 370a of the first end portion 356 and an outer surface 370b of the second end portion 360 to prevent wearing of the first and second end portions 356, 360 respectively. The dampening component 342 may be a flexible component configured to bend along the radial direction 152. A portion of the dampening component 342 is disposed within the first extended hollow section 344. In the illustrated embodiment, the portion of the dampening component 342 that is disposed within the first extended hollow section 344 includes the arm portion 358 and the first end portion 356 of the dampening component 342. Specifically, the first end portion 356 is disposed within the first extended hollow section 344 to frictionally couple the first end portion 356 to the first extended hollow section 344. In general, while installation, the first end portion 356 is squeezed inwardly along a radial direction 152 of the dampening component 342 and disposed within the first extended hollow section 344 through the second end 348 of the first extended hollow section 344 such that the outer surface 370a of the first end portion 356 is frictionally coupled to an inner surface 374 of the first extended hollow section 344. Similarly, another portion of the dampening component 342 is disposed within the second extended hollow section 378. In the illustrated embodiment, the other portion may include the arm portion 358 and the second end portion 360. Specifically, the second end portion 360 is disposed within the second extended hollow section 378 to frictionally couple the second end portion 360 to the second extended hollow section 378. While installation, the second end portion 360 may be squeezed inwardly along the radial direction 152 and disposed within the second extended hollow section 378 through the second end 382 of the second extended hollow section 378 such that the outer surface 370b of the second end portion 360 is frictionally coupled to an inner surface 374b of the second extended hollow section 378.

In the illustrated embodiment, the first tubular element 312 and the second tubular element 314 are disposed along a same plane. In such embodiments, the first end portion 356 may be inserted within the first extended hollow section 344 at 0 degree relative to the axial direction 154. Similarly, the second end portion 360 may be inserted within the second extended hollow section 378 at 0 degree relative to the axial direction 154. In some other embodiments, the first and second tubular elements 312, 314 may be disposed at different planes. In such embodiments, the first curved end surface of the first end portion 356 and the second curved end surface of the second end portion 360 allow the dampening component 342 to be inserted within the first and second extended hollow sections 344, 378 respectively at a wide range of angle.

In the illustrated embodiment, the first and second tubular elements 312, 314 are disposed along a same plane and not parallel to one another. In such embodiments, the damper 306 is configured to frictionally resist the relative motion between the first and second tubular elements 312, 314. In certain embodiments, the first tubular element 312 and the second tubular element 314 may not be disposed along a same plane and may be parallel to one another. In such embodiments, the damper 306 may be configured to frictionally resist relative motion generated by the first tubular element 312 and the second tubular element 314 disposed along different planes and parallel to one another.

During operation, the dampening component 342 may be held in a locked position within the first and second components 340, 376 until sliding forces produced by vibration between the dampening component 342 and the first and second components 340, 376 respectively exceed static frictional forces generated between the first end portion 356 and the first extended hollow section 344 and/or the second end portion 360 and the second extended hollow section 378. In certain embodiments, the static frictional forces may be generated due to i) geometrical interferences between the first end portion 356 and the first extended hollow section 344 and/or ii) geometrical interferences between the second end portion 360 and the second extended hollow section 378. Once the sliding forces exceeds the static friction forces, the dampening component 342 may slide, rotate, or tilt within the first and second extended hollow sections 344, 378, and thereby frictionally resist the relative motion between the first and second tubular elements 312, 314 to dampen vibration. Further, the dampening component 342 may be allowed to slide or rotate within the first and second components 340, 376, thereby managing static movements generated due to the thermal expansion of the first and/or second tubular elements 312, 314.

Figure 5:
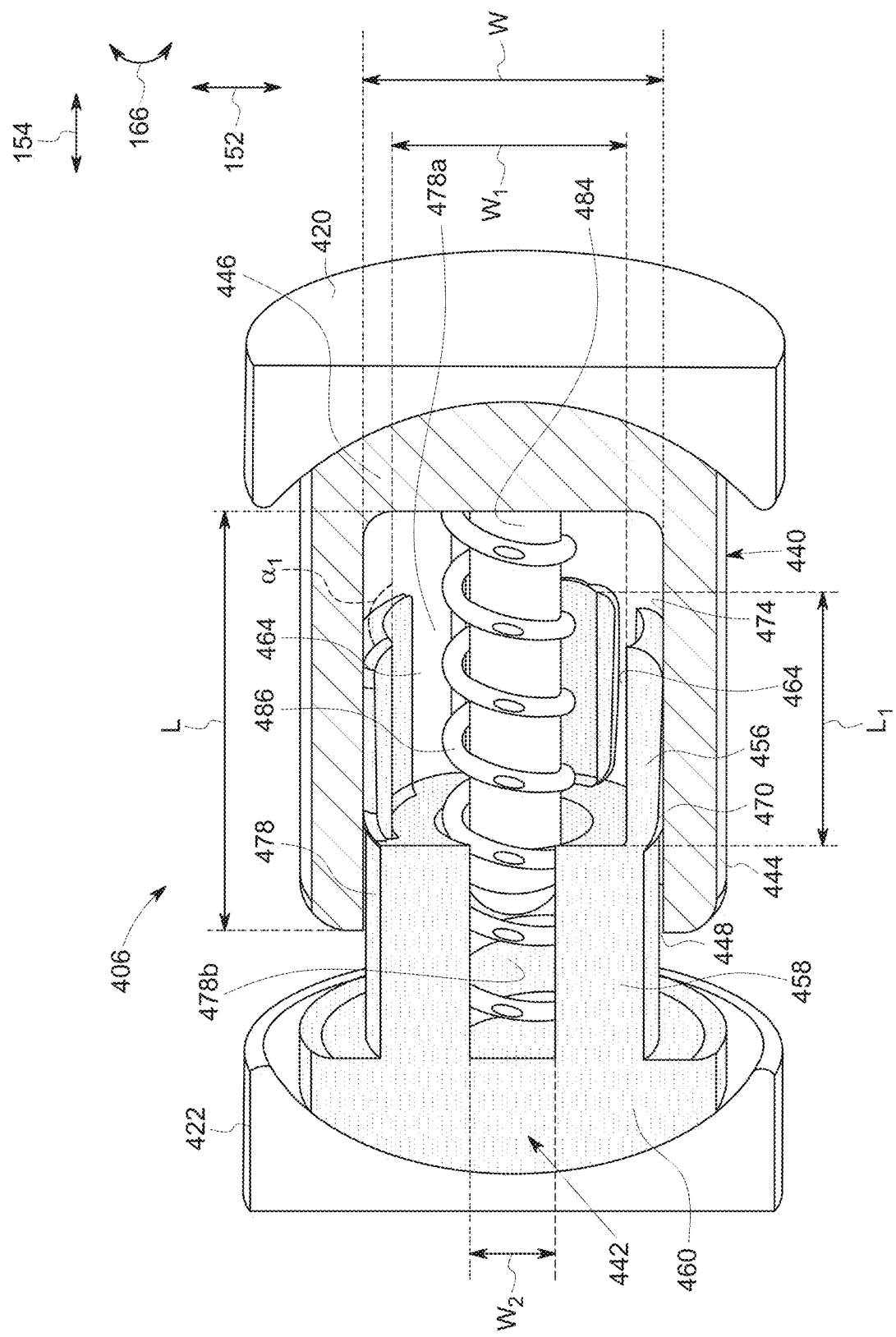
FIG. 5 is schematic view of a damper in accordance with yet another embodiment of the present disclosure.

FIG. 5 illustrates a schematic view of a damper 406 in accordance with yet another embodiment of the present disclosure. In one example embodiment, the damper 406 includes a first component 440 and a dampening component 442. In one embodiment, the damper 406 may be configured to frictionally resist a relative motion between a first tubular element and a second tubular element (not shown in FIG. 5) to regulate vibration between the first and second tubular elements.

In the illustrated embodiment, the first component 440 includes a first extended hollow section 444 including a first end 446 and a second end 448. The first end 446 is coupled to the first tubular element via a first retention element 420. The first extended hollow section 444 extends along an axial direction 154 of the first component 440. The first extended hollow section 244 has a width "W". The first component 440 further includes a protrusion 484 disposed within the first extended hollow section 444. The protrusion 484 extends along the axial direction 154 up to a length "L" of the first extended hollow section 444.

In the illustrated embodiment, the dampening component 442 has a second extended hollow section 478 having a first end portion 456, a second end portion 460, and an arm portion 458. The second end portion 460 is located opposite to the first end portion 456. In the illustrated embodiment, the first end portion 456 has a spherical structure. In certain embodiments, the first end portion 456 may have elliptical structure. The second extended hollow section 478 has a first hollow portion 478a having a first width "$W_1$" and a second hollow portion 478b having a second width "$W_2$" connected to the first width "$W_1$". The first width "$W_1$" is different from the second width "$W_2$". In the illustrated embodiment, the second width "$W_2$" is smaller than the first width "$W_2$". Further, the first width "$W_1$" is smaller than the width "W". The dampening component 442 further includes a plurality of slits 464 extending along the axial direction 154 from the first end portion 456 towards the second end portion 460 up to a length "$L_1$". In the illustrated embodiment, the length "$L_1$" extends up to a length of the first end portion 456. In some embodiments, the length "$L_1$" may be in a range from about 30 percent to about 50 percent of a total length of the dampening component 442. The plurality of slits 464 is spaced apart from each other along a circumferential direction 166 of the dampening component 442. The second end portion 460 is coupled to a second retention element 422. The first end portion 456 has a curved end surface inclined at a first angle "$\alpha_1$" relative to the axial direction 154. In some embodiments, the first component 440 and the dampening component 442 are made of a high temperature alloy material, for example, a cobalt-nickel-chromium-tungsten alloy. In certain embodiments, the dampening component 442 may further include a wear resistant coating, for example, silicon carbide disposed on an outer surface 470 of the first end portion 456 to prevent wearing of the first end portion 456. The dampening component 442 may be a flexible component configured to bend along a radial direction 152 of the dampening component 442.

The damper 406 may further include a helical spring 486 disposed around the protrusion 484. In certain embodiments, the helical spring 486 is inserted in a pre-stress condition around the protrusion 484. The first end portion 456 is disposed within the first extended hollow section 444 to frictionally couple the first end portion 456 to the first extended hollow section 444. While installation, the first end portion 456 is generally squeezed inwardly along the radial direction 152 and disposed within the first extended hollow section 444 such that the outer surface 470 of the first end portion 456 is frictionally coupled to an inner surface 474 of the first extended hollow section 444, and the helical spring 486 is disposed within the first and second hollow portions 478a, 478b. In the illustrated embodiment, the first retention element 420 and the second retention element 422 are disposed parallel to each other along a same plane. In such embodiments, the first end portion 456 may be inserted into the first extended hollow section 444 at 0 degree relative to the axial direction 154. In some other embodiments, the first and second tubular elements may not be disposed along a same plane and may not be parallel to one another. In such embodiments, the damper 406 may be configured to frictionally resist relative motion generated by the first and second tubular elements disposed along different planes and not parallel to one another.

During operation, the helical spring 486 pushes the first component 440 and the dampening component 442 against the first retention element 420 and the second retention element 422 respectively. The dampening component 442 may be held in a locked position within the first component 440 until sliding forces produced between the dampening component 442 and the first component 440 exceed static frictional forces generated between the first end portion 456 of the dampening component 442 and the first extended hollow section 444 of the first component 440. In certain embodiments, the static frictional forces may be generated due to geometrical interferences between the first end portion 456 and the first extended hollow section 444. Once the sliding forces exceeds the static friction forces, the dampening component 442 may slide or rotate within the first extended hollow section 444, and thereby frictionally resist the relative motion between the first and second tubular elements to dampen vibration. Further, the dampening component 442 may be allowed to slide or rotate within the first component 440, thereby managing static movements generated due to the thermal expansion of the first and/or second tubular elements.

Figure 6:
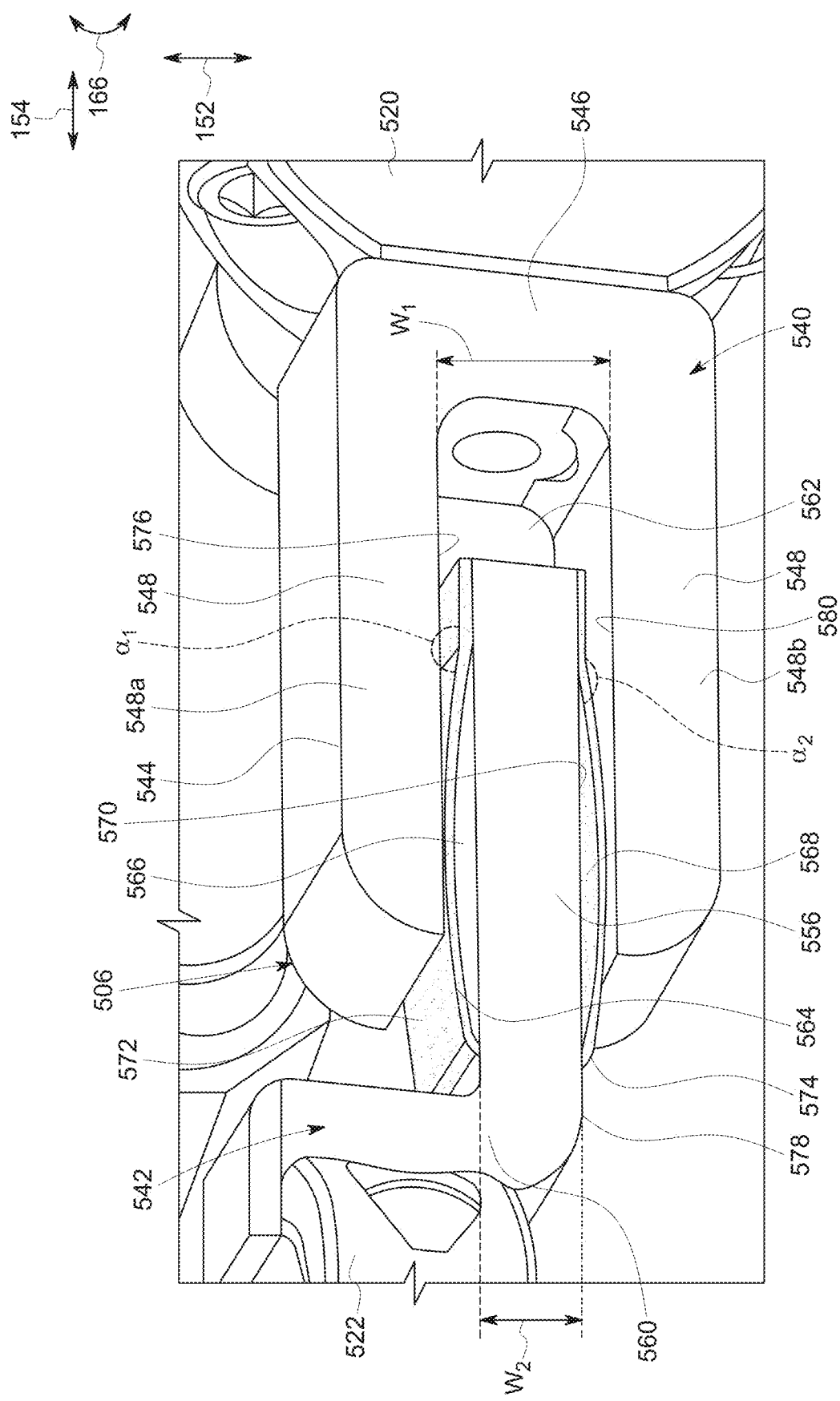
FIG. 6 is a schematic view of a damper in accordance with yet another embodiment of the present disclosure.

FIG. 6 illustrates a schematic view of a damper 506 in accordance with yet another embodiment of the present disclosure. In one example embodiment, the damper 506 includes a first component 540 and a dampening component 542. In one embodiment, the damper 506 may be configured to frictionally resist a relative motion between a first tubular element and a second tubular element (not shown in FIG. 6) to regulate vibration between the first and second tubular elements.

In the illustrated embodiment, the first component 540 includes a first extended section 544 having an end portion 546 and a two-pronged fork portion 548. The end portion 546 is coupled to the first tubular element via a first retention element 520. The two-pronged fork portion 548 includes a hollow portion 562 located between the two prongs 548a, 548b. The first extended section 544 extends along an axial direction 154 of the first component 540. The first extended section 544 has a first width "$W_1$" between the two prongs 548*a*, 548*b*.

The dampening component 542 has a second extended section 578 having a first end portion 556 extending along an axial direction 154 of the dampening component 542 and a second end portion 560 extending along a radial direction 152 of the dampening component 542. In the illustrated embodiment, the second extended section is a L-shaped component. The first end portion 556 is located opposite to the second end portion 560. The first end portion 556 has a second width "$W_2$" different from the first width "$W_1$". In the illustrated embodiment, the first width "$W_1$" is greater than the second width "$W_2$". The dampening component 542 includes a first leaf spring 564 coupled to a first surface 566 of the first end portion 556. The dampening component 542 further includes a second leaf spring 568 coupled to a second surface 570 of the first end portion 556. The second end portion 560 is coupled to a second retention element 522. The first leaf spring 564 has a first curved end surface inclined at a first angle "$\alpha_1$" relative to the axial direction 154. The second leaf spring 568 has a second curved end surface inclined at a second angle "$\alpha_2$" relative to the axial direction 154. The first component 540 and the dampening component 542 may be made of a high temperature alloy material, for example, cobalt-nickel-chromium-tungsten alloy. In certain embodiments, the damper 506 may include a wear resistant coating, for example, silicon carbide disposed on a respective outer surface 572, 574 of the first leaf spring 564 and the second leaf spring 568 to prevent wearing of the first leaf spring 564 and the second leaf spring 568. The first leaf spring 564 and the second leaf spring 568 may be flexible components configured to bend along the radial direction 152. The first end portion 556 is disposed within the first extended section 544 to frictionally couple the first leaf spring 564 and the second leaf spring 568 to the two prongs 548*a*, 548*b* respectively. While installation, the first leaf spring 564 and the second leaf spring 568 may be squeezed inwardly along the radial direction 152 and disposed within the two-pronged fork portion 548 such that the outer surface 572 of the first leaf spring 564 is frictionally coupled to an inner surface 576 of the prong 548*a*, and the outer surface 574 of the second leaf spring 568 is frictionally coupled to an inner surface 580 of the prong 548*b*.

During operation, the first end portion 556 of the dampening component 542 may be held in a locked position within the first extended section 544 of the first component 540 until sliding forces produced between the dampening component 542 and the first component 540 exceed static frictional forces generated between the first end portion 556 and the first extended section 544. In certain embodiments, the static frictional forces may be generated due to geometrical interferences between the first end portion 556 and the first extended section 544. Once the sliding forces exceeds the static friction forces, the dampening component 542 may slide along the two-pronged fork portion 548, and thereby frictionally resist the relative motion between the first and second tubular elements to dampen vibration. Further, the dampening component 542 may be allowed to slide along the two-pronged fork portion 548 of the first component 540, thereby managing static movements generated due to the thermal expansion of the first and/or second tubular elements.

In accordance with one or more embodiments discussed herein, damper may be configured to dampen a relative motion between at least two components such as a first tubular element and a second tubular element. The dampen may be configured to perform one or more of frictionally slide, rotate, and tilt a dampening component within a first extended portion for resisting the relative motion between the at least two components. The damper may be deployed in a high temperature application area, which operates in a temperature range from about 900 degrees Fahrenheit to about 1200 degrees Fahrenheit. Further, the damper may allow static movements generated due to thermal expansion of first and/or second tubular elements, and thereby prevent static stress on the first and/or second tubular elements.

While only certain features of embodiments have been illustrated and described herein, many modifications and changes will occur to those skilled in the art. It is, therefore, to be understood that the appended embodiments are intended to cover all such modifications and changes as falling within the spirit of the disclosure.

The invention claimed is:

1. A damper comprising:
a first component coupled to a first tubular element and comprising a first extended hollow section, wherein the first component has a first through-hole for receiving and holding the first tubular element; and
a dampening component coupled to a second tubular element, wherein the dampening component has a second through-hole for receiving and holding the second tubular element, wherein the dampening component comprises a first end portion comprising a plurality of slits, and wherein the first end portion is disposed within the first extended hollow section to frictionally couple the first end portion to the first extended hollow section.

2. The damper of claim 1, wherein each of the plurality of slits extends along an axial direction of the dampening component from the first end portion up to a length, and wherein the plurality of slits is spaced apart from each other along a circumferential direction of the dampening component.

3. The damper of claim 1, further comprising a second component, wherein the dampening component is operatively coupled to the second tubular element via the second component, wherein the second component is coupled to the second tubular element and comprises a second extended hollow section, wherein the dampening component further comprises a second end portion opposite to the first end portion and comprising a plurality of slits, and wherein the second end portion is disposed within the second extended hollow section to frictionally couple the second end portion to the second extended hollow section.

4. The damper of claim 3, wherein each of the plurality of slits of the second end portion extends along an axial direction of the dampening component from the second end portion up to a length, and wherein the plurality of slits of the second end portion is spaced apart from each other along a circumferential direction of the dampening component.

5. The damper of claim 3, wherein the first end portion comprises a first curved end surface inclined at a first angle relative to an axial direction of the dampening component, and wherein the second end portion comprises a second curved end surface inclined at a second angle relative to the axial direction.

6. The damper of claim 1, wherein the first component further comprises a protrusion disposed within the first extended hollow section, and wherein the protrusion extends along an axial direction of the first component up to a length of the first extended hollow section.

7. The damper of claim 6, wherein the dampening component comprises a second extended hollow section comprising a first hollow portion having a first width and a second hollow portion connected to the first hollow portion and having a second width different from the first width.

8. The damper of claim 7, further comprising a helical spring disposed around the protrusion, and within the first and second extended hollow sections.

9. A damper comprising:
a first component coupled to a first tubular element and comprising a first extended hollow section, wherein the first component has a first through-hole for receiving and holding the first tubular element; and
a dampening component coupled to a second tubular element, wherein the dampening component has a second through-hole for receiving and holding the second tubular element, wherein the dampening component comprises a first end portion comprising a plurality of slits, wherein a portion of the dampening component is disposed within the first extended hollow section to frictionally couple the first end portion to the first extended hollow section, and
wherein the damper is configured to frictionally resist a relative motion between the first and second tubular elements by performing one or more of:
frictionally slide the dampening component within the first extended hollow section along an axial direction of the dampening component;
frictionally rotate the dampening component within the first extended hollow section along a circumferential direction of the dampening component; and
frictionally tilt the dampening component within the first extended hollow section, relative to the axial direction.

10. The damper of claim 9, further comprising a second component, wherein the dampening component is operatively coupled to the second tubular element via the second component, wherein the second component is coupled to the second tubular element and comprises a second extended hollow section, wherein the dampening component further comprises a second end portion opposite to the first end portion and comprising a plurality of slits, and wherein another portion of the dampening component is disposed within the second extended hollow section to frictionally couple the second end portion to the second extended hollow section.

11. The damper of claim 10, wherein the plurality of slits is configured to regulate:
stiffness of the first and second end portions;
an amount of interacting surface of the first end portion and the first extended hollow section for frictionally resist the relative motion between the dampening component and the first component; and
an amount of interacting surface of the second end portion and the second extended hollow section for frictionally resist the relative motion between the dampening component and the second component.

12. A fuel delivery system comprising:
a conduit assembly comprising a plurality of tubular elements, each of the plurality of tubular elements comprising a first tubular element and a second tubular element, and wherein the second tubular element is fluidly coupled to the first tubular element and a fuel injector; and
a damper comprising:
a first component coupled to the first tubular element and comprising a first extended hollow section, wherein the first component has a first through-hole for receiving and holding the first tubular element; and
a dampening component coupled to the second tubular element, wherein the dampening component has a second through-hole for receiving and holding the second tubular element, wherein the dampening component comprises a first end portion comprising a plurality of slits, wherein a portion of the dampening component is disposed within the first extended hollow section to frictionally couple the first end portion to the first extended hollow section.

13. The fuel delivery system of claim 12, wherein each of the plurality of slit extends along an axial direction of the dampening component from the first end portion up to a length, and wherein the plurality of slits is spaced apart from each other along a circumferential direction of the dampening component.

14. The fuel delivery system of claim 12, further comprising a second component, wherein the dampening component is operatively coupled to the second tubular element via the second component, wherein the second component is coupled to the second tubular element and comprises a second extended hollow section, wherein the dampening component further comprises a second end portion opposite to the first end portion and comprising a plurality of slits, wherein another portion of the dampening component is disposed within the second extended hollow section to frictionally couple the second end portion to the second extended hollow section.

15. The fuel delivery system of claim 14, wherein each of the plurality of slits of the second end portion extends along an axial direction of the dampening component from the second end portion up to a length, and wherein the plurality of slits of the second end portion is spaced apart from each other along a circumferential direction of the dampening component.

16. The fuel delivery system of claim 14, wherein the first end portion comprises a first curved end surface inclined at a first angle relative to an axial direction of the dampening component, and wherein the second end portion comprises a second curved end surface inclined at a second angle relative to the axial direction.

17. The fuel delivery system of claim 12, wherein the first component further comprises a protrusion disposed within the first extended hollow section, and wherein the protrusion extends along an axial direction of the first component up to a length of the first extended hollow section.

18. The fuel delivery system of claim 17, wherein the dampening component comprises a second extended hollow section comprising a first hollow portion having a first width and a second hollow portion connected to the first hollow portion and having a second width different from the first width.

19. The fuel delivery system of claim 18, further comprising a helical spring disposed around the protrusion, and within the first and second extended hollow sections.

20. A turbomachine comprising:
a combustor; and
the fuel delivery system of claim 12,
wherein the fuel delivery system is coupled to the combustor.

* * * * *